United States Patent [19]
Benson

[11] Patent Number: 4,667,436
[45] Date of Patent: May 26, 1987

[54] ELECTRICAL APPARATUS FOR ERADICATING FIRE ANTS

[75] Inventor: James A. Benson, Nixon, Tex.

[73] Assignee: Yaard-Vark Corporation, Bryan, Tex.

[21] Appl. No.: 761,976

[22] Filed: Aug. 2, 1985

[51] Int. Cl.⁴ .............................................. A01M 1/22
[52] U.S. Cl. ..................................... 43/132.1; 43/112
[58] Field of Search ................... 43/132.1, 1, 112, 124

[56] References Cited

U.S. PATENT DOCUMENTS

| | | | |
|---|---|---|---|
| 1,065,782 | 6/1913 | Cronk | 43/112 |
| 1,549,161 | 8/1925 | Sutton | 43/112 |
| 1,932,237 | 10/1933 | Warner | 43/124 X |
| 2,450,597 | 10/1948 | Karnowski | 43/124 X |
| 2,897,629 | 8/1959 | Jesman | 43/112 |
| 3,058,250 | 10/1962 | Thomas | 43/1 X |
| 3,258,872 | 7/1966 | Senkewich | 43/132.1 |
| 3,879,702 | 4/1975 | Mancone | 340/15 |
| 3,891,962 | 6/1975 | White | 340/15 |
| 3,898,756 | 8/1975 | Tolle | 43/1 X |
| 4,097,838 | 6/1978 | Fiala | 340/15 |
| 4,215,429 | 7/1980 | Riach | 367/139 |
| 4,219,884 | 8/1980 | DeSantis | 367/139 |
| 4,223,468 | 9/1980 | Lawrence | 43/132.1 |
| 4,366,644 | 1/1983 | Lawrence | 43/132.1 |
| 4,414,653 | 11/1983 | Pettinger | 367/139 |
| 4,471,561 | 9/1984 | Lapierre | 43/112 X |

*Primary Examiner*—Nicholas P. Godici
*Assistant Examiner*—Carmine Cuda
*Attorney, Agent, or Firm*—Luedeka & Neely

[57] ABSTRACT

An apparatus powered by an electric alternating current source comprising an insulator having the upper end of a spike mounted therein and two wires wrapped about the insulator forming a double helical coil. The two wires have a voltage of about 1000–1500 volts placed across them to electrocute fire ants upon contact. The spike is inserted into the ground thus supporting the apparatus in an upright position.

4 Claims, 5 Drawing Figures

U.S. Patent  May 26, 1987  Sheet 1 of 2  4,667,436
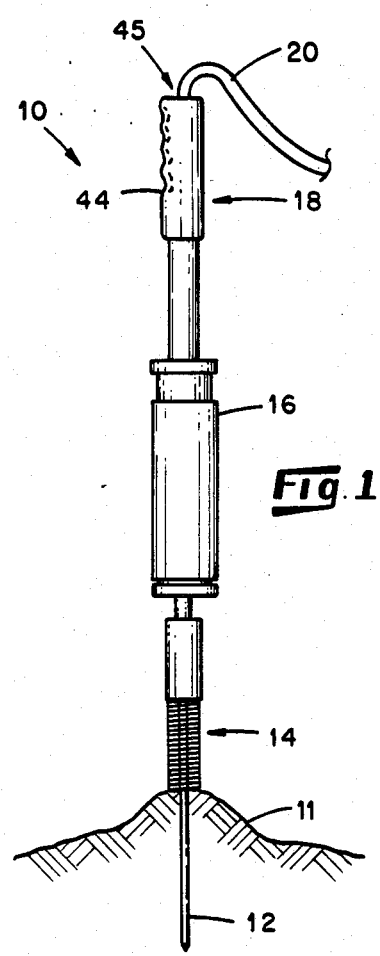
Fig.1
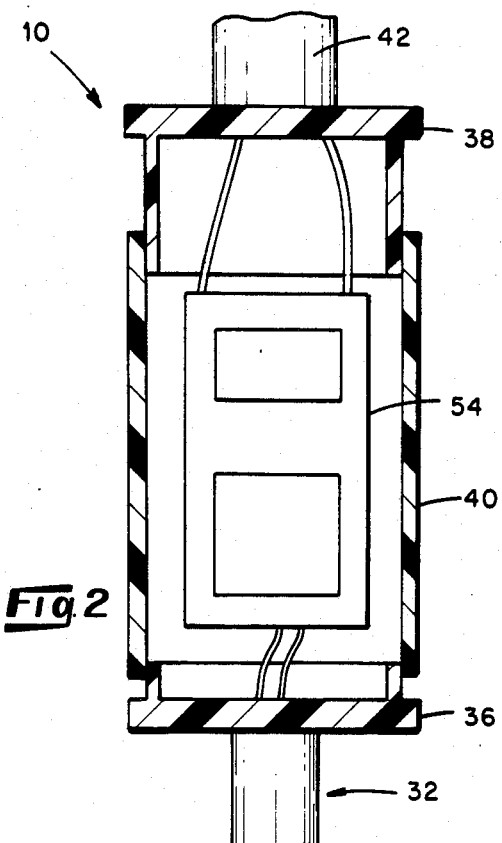
Fig.2
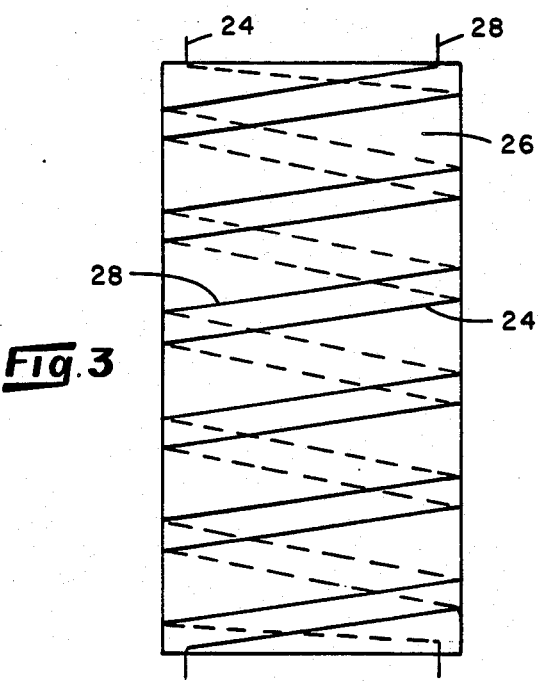
Fig.3
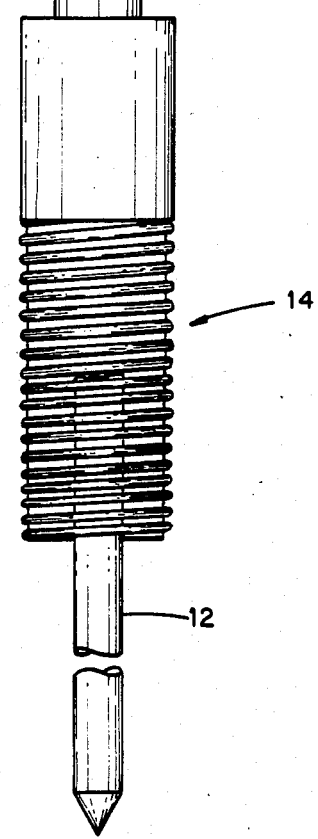

ELECTRICAL APPARATUS FOR ERADICATING FIRE ANTS

The present invention relates to the control and eradication of verminous insects and more particularly relates to a method and apparatus for eradicating fire ants in an anthill.

Fire ants have been spreading from Mexico into the southwestern United States in recent years. As their name suggests, fire ants inflict painful bites due to the ant's venomous saliva which is injected during a bite. In large numbers, the bites can be threatening to one's health particularly when an individual has an allerigic reaction. In addition, fire ants have been known in kill livestock.

Like some other kinds of ants, fire ants live in anthills with underground tunnels and chambers. However, known methods for controlling ants, termites and other social insects with chemical poisons have been found to be ineffective for controlling fire ants. The fire ants are often able to escape poisons due to the extensiveness of the tunnels and passageways in their underground nests. In addition, the release of effective quantities of poisons into an anthill can be a potential health risk, particularly for children, and can also be injurious to animals and vegetation.

Accordingly, a need has arisen for an effective method and apparatus for controlling fire ants. Furthermore, there is a need for a method and apparatus for use in controlling fire ants which does not present a health risk to humans or animals and which does not cause environmental damage.

In accordance with one form of the present invention, an apparatus connected to an electric power source for eradicating fire ants in an anthill includes an electrode on an insulator. The apparatus further includes means for supporting the electrode proximate to the anthill. A voltage supply means is provided for producing from the electrical power source and supplying to the electrode an oscillating voltage of sufficient voltage and at a frequency to cause ants to attack and kill each other and to drive the survivors from the area.

In accordance with a more particular form of the apparatus of the present invention, there is provided a electrode comprising two coiled wires generally evenly spaced-apart from one another in a double helical arrangement with the source being supplied across the two coiled wires. The spacing of the wires and the voltage is such that a fire ant bridging the space between the wires is electrocuted.

In accordance with another more particular form of the present invention, the voltage supply produces an oscillating voltage of between about 1000 to 1500 volts.

In accordance with another more particular form of the present invention, the voltage supply means produces an oscillating voltage at a frequency of about 60 cycles per second.

In accordance with one form of the method of the present invention, the method includes locating an anthill containing a colony of fire ants and disposing an electrode supplied with oscillating voltage source adjacent to the anthill having sufficient voltage and freqeuncy of oscillation to cause the fire ants to attach and kill each other and to drive survivors from the area. According to the method, the electrode is disposed adjacent the anthill for a sufficient period of time to eradicate the colony of fire ants.

The present invention may best be understood by reference to the following detailed description of the preferred embodiment and accompanying drawings in which:

FIG. 1 is an elevational view of a preferred embodiment of the apparatus of the present invention for eradicating fire ants shown inserted into an anthill;

FIG. 2 is an enlarged view of the apparatus of FIG. 1 shown partially in cross-section;

FIG. 3 is an enlarged somewhat diagrammatical view of a double helical coil of the apparatus according to the present invention;

Figure 4:
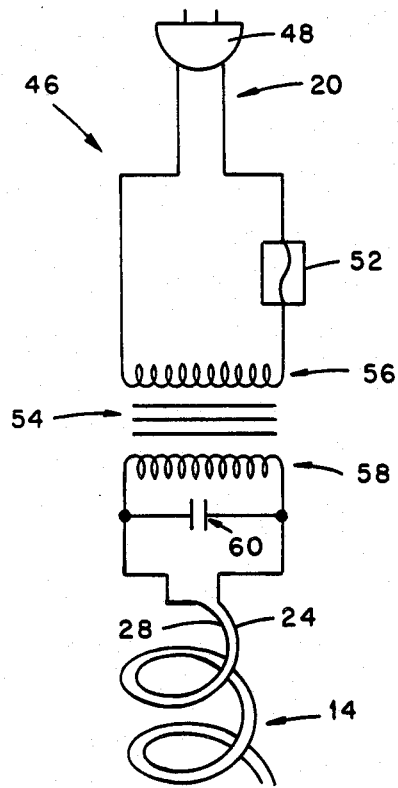
FIG. 4 is a schematic view of the electronic circuitry of the preferred embodiment of the present invention.

Referring now to the drawings in which like reference characters designate like or corresponding parts throughout the several views, there is shown inserted into an anthill one form of the ant eradicator apparatus 10 according to the present invention. As illustrated in FIG. 1, the apparatus 10 includes a spike 12 such as a sharpened steel rod for being inserted into the anthill 11 to support the apparatus 10 in a generally upright position. Adjacent the spike 12 is an electrode 14 for being positioned proximate to the anthill 11.

The electrode 14 is supplied by the apparatus 10 with an oscillating voltage of sufficient voltage and at a frequency to eradicate the fire ants by by causing the ants to attack and kill one another and which causes any surviving ants to be driven away. Therefore, with respect to this description of the method and apparatus according to the present invention, the word "eradicating" is intended to refer to the partial or complete elimination of fire ants from an anthill by the direct or indirect killing of the ants, by driving the ants away from the area, by disturbing the reproductive capabilities of the colony of fire ants or by any combination of these factors.

Referring to FIGS. 1 and 2, a housing 16 is provided above the electrode 14 for enclosing and protecting electronic components of the apparatus 10 which supply voltage to the electrode 14. Above the housing 16 is a handle 18 which is usable to apply either upward or downward pressure to the apparatus 10 to remove or insert the spike 12 into the anthill. A power supply cord 20 is provided for supplying electric power to the apparatus.

Figure 5:
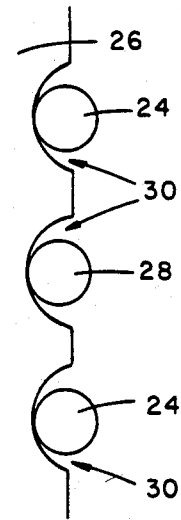
FIG. 5 is a partially broken-away enlarged view of the double helical coil of FIG. 2.

Referring now to FIGS. 2, 3 and 5, it is shown that the electrode 14 includes a pair of spaced-apart conductors, preferably a double helical arrangement of coiled wire. As shown somewhat diagrammagically in FIG. 3, the double helical arrangement includes a first wire 24 which is coiled around an insulator 26. A second wire 28 is coiled in the same direction from the first wire 24 and is generally evenly spaced-apart from the first wire 24 at a distance such that a single fire ant can bridge the space between the wires and be electrocuted; preferably, the distance is between about 1/16 and ⅛ inches. As shown, it is also preferable for the insulator 26 to be cylindrical to support the first and second wires 24 and 28 in the double helical arrangement when the wires are wrapped around the insulator 26. A suitable insulator 26 is provided by a cylindrical block of, for example, acrylic plastic.

As is is shown in FIGS. 2 and 5 for the preferred embodiment, generally evenly-spaced double helical grooves 30 are formed in the insulator 26 and the first and second wire 24 and 28 ae wrapped in the grooves 30 to maintain the first and second wires in the double helical arrangement with the wires being slightly recessed but still exposed along the surface of the insulator 26. As is most preferred as shown in FIGS. 2 and 5, the distance from a coil of the first wire 24 to a coil of the second wire 28 either upwardly or downwardly is approximately equal. The electrode 14 of the preferred embodiment thus provides a support surface for the ants and, when an ant is in a position where it bridges between any two adjacent coils, the ant will be electrocuted.

Referring still to FIG. 2 the insulator 26 is connected to a support sleeve 32 which extends upwardly about an extension of the axis of the insulator 26 and is about the same diameter as the insulator. The housing 16 is connected above the support sleeve 32.

As illustrated in FIG. 2 for the preferred embodiment, the housing 16 includes a lower cap 36, an upper cap 38, and a central tube 40 to which the upper cap and lower cap are connected. The central tube 40 is of an appropriate size to contain the components enclosed in the housing 34 and preferably is coaxially with the support sleeves. The upper and lower caps, 36 and 38 respectively, are suitably provided by polyvinyl chloride (pvc) pipe reducing fittings and the support sleeve 32 is suitably-sized pvc pipe which fits into the reduction fitting and which is secured by gluing or other such means to form a waterproof seal. Similarly, the central tube 40 is a section of pvc pipe of the appropriate length and diameter to provide the housing with sufficient interior space.

Attached to the upper cap 38 is a handle extension 42 and handle grip 44. The handle extension 42 is also suitably provided by a length of pvc pipe which is attached to the reducing fitting forming the upper cap 38 by gluing or other such means to form a waterproof seal. The handle grip 44 is suitably provided by any type of handle grip of a resilient material such as grips used on the handle bars of bicycles, wheelbarrows, and the like. A hole 45 in the end of the handle grip 44 provides access for the power cord 20 into the handle extension 42 of the apparatus 10.

Referring now to FIG. 4, preferred electronic circuitry 46 for the present invention is depicted. The electronic circuitry 46 illustrated in FIG. 4 is capable of producing and supplying a voltage to the electrode 14 of sufficient voltage and at a frequency which causes the ants to attack and kill each other and to drive survivors from the area when the electrode is adjacent to the anthill 11. While it is not completely understood how the ant eradicator works, it is believed that one or a combination of mechanical effects, radiative effects, electrical effects, and chemical effects are responsible for the "eradicating effect" of the method and apparatus of the present invention.

As illustrated in FIG. 4, electronic circuitry 46 for the preferred embodiment of the present invention is made to operate on ordinary house current, 115 VAC, 60 cycles per second. It is believed that voltage oscillations in the range of 60 cycles per second may be important to the operation of the apparatus due to electromagnetic or electrical effects although it is likely that other oscillation rates in this general range may also be effective. As illustrated in FIG. 4, a power supply plug 48 and power supply cord 20 are used to provide power to the circuit. Preferably, a circuit breaker 52 is provdided between the power supply cord 20 and the remainder of the electronic circuitry 46 to increase safety.

As further shown in FIG. 4, the circuitry 46 includes a step-up transformer 54. The step-up transformer 54 depicted steps-up the voltage supplied an input connected to a primary winding 56 to produce a sufficient voltage to cause the ants to attack and kill each other. Most preferably, the transformer 54 should be capable of producing at least about 1000 VAC at 10 milliamperes such as the the SS-700 Fence Controller Transformer manufactured by Fi-Shock, Inc., Knoxville, Tenn. To an output connected to a secondary winding 58 of the step-up transformer 54, the electrode 14 is connected. The voltage supplied to the electrode 14 in the preferred embodiment is sufficient to electrocute ants which bridge between the first and second wires 24 and 28, respectively.

As is further shown in FIG. 4, to increase resonance in the circuit, it is preferable for a capacitor 60 to be connected between the output leads of the secondary coil to balance the inductive and capacitive reactance components of the circuit. With the SS-700 Fence Controller Transformer, it is desirable to use a 0.01 MFD, 2 KV capacitor. Using this capacitor, the voltage provided between the first wire and second wire, 24 and 28 respectively, is approximately 1000 to 1500 VAC.

In operation and in order to practice the method of the present invention, the approximate center of an anthill is located, usually at the highest point of the mound. The spike 12 is inserted by applying pressure to he handle 48 and the apparatus 10 is connected to a source of 115 VAC. As shown in FIG. 1 for the preferred apparatus according to the present invention, the spike 12 is inserted into the anthill so that the electrode 14 is closely adjacent to the ground surface. The apparatus 10 provides an oscillating voltage source adjacent to the anthill which has sufficient voltage and frequency to cause the fire ants to attack and kill each other and to drive survivors from the area. The apparatus is used in this manner until the ants are eradicated. In order to determine the thoroughness of the eradication, results may be visibly observe by looking for live ants or digging into the anthill to determine whether live ants remain in the area.

As noted previously it is believed that the method and apparatus of the present invention are effective due to several factors. At least some of the ants are killed by directly being electrocuted by the electrode 14 of the preferred embodiment when an ant bridges between the first and second wires 24 and 28 of the electrode 14. The arcing which occurs creates an intense sound wave which could disturb the ants and cause them to attach each other. It is also believed that the arcing could cause various electromagnetic radiation which could be annoying to the ants. In addition to the effects caused by the arcing when ants are electrocuted, the coiled wire electrode with the electric fields oscillating at 60 cycles per second could cause the disturbing effect on the ants. One additional effect which is believed to be involved in the eradication process is "gaster flagging", i.e., fire ants spraying their poison in a fine aerosol in the air as a signal to other ants. It is believed that the apparatus and method of the present invention may cause gaster flagging which causes the other ants to be disturbed and to attack and kill one another.

The method and apparatus of the present invention is effective for eradicating fire ants within a short period of time without producing detrimental environmental effects. Furthermore, the ant eradicator apparatus and method can be used repeatedly if necessary and overall an inexpensive and effective eradication is achieved. The preferred apparatus of the present invention is safe to use since the entire housing is made of an insulating material which is also resistant to damgage by exposure to weather.

While a preferred embodiment of the present invention has been shown and described, it is to be understood that the present invention is capable of numerous modifications and rearrangements without departing from the spirit of the invention as set forth in the appended claims.

What is claimed is:

1. An apparatus connected to an alternating current electric power source at about 60 cycles per second for eradicating ants in an anthill, comprising:
    a spike for being inserted into an anthill to support the apparatus adjacent to the hill;
    an insulator having the upper end of said spike mounted therein;
    a first wire wrapped about said insulator to form spaced apart coils on the surface of said insulator; said second
    a second wire wrapped about said insulator to form spaced apart coils on the surface of said insulator, said second wire being spaced-apart from and between the coils of said first wire to form a double helical coil;
    a transformer having an input and an output for producing a voltage gain between the input and output, said output being connected to said first and second wires to place a potential difference across said wires;
    means for connecting the input of said transformer to the power source;
    the voltage gain of said transofrmer being sized to place a voltage of between about 1000 and about 1500 volts across said first and second wires to electrocute and fire ant that crawls across and bridges between said first and second wires and cause the ants to being attaching and killing each other and to drive the survivors out of the area; and
    a said first and second wires being supported by said insulator and spike such that no substantial electrical energy is directly conducted into the anthill.

2. The apparatus of claim 1 wherein the spacing between the coils of said first and second wires is between about 1/16 and about ⅛ inch.

3. The apparatus of claim 1 wherein said transformer is enclosed in a housing above said insulator and supported by said spike.

4. The apparatus of claim 3 further comprising a handle secured to said housing for applying pressure to the apparatus to insert and remove the spike from the ground.

* * * * *